Jan. 14, 1969 F. L. VOGEL, JR 3,421,936

SILICON NITRIDE COATING ON SEMICONDUCTOR AND METHOD

Filed Dec. 21, 1964

INVENTOR

FERDINAND L. VOGEL, JR.

BY Connolly and Hutz

ATTORNEYS

United States Patent Office 3,421,936

Patented Jan. 14, 1969

3,421,936

SILICON NITRIDE COATING ON SEMICONDUCTOR AND METHOD

Ferdinand Lincoln Vogel, Jr., Williamstown, Mass., assignor to Sprague Electric Company, North Adams, Mass., a corporation of Massachusetts Filed Dec. 21, 1964, Ser. No. 419,814
U.S. Cl. 117—215 8 Claims
Int. Cl. H01g 9/00; H01c 7/00; H01l 7/36

ABSTRACT OF THE DISCLOSURE

A semiconductor structure having a monocrystalline silicon semiconductor with a single crystal silicon nitride layer on a major surface of the silicon semiconductor material produced by deposition on the silicon surface from a gaseous atmosphere.

This invention relates to the manufacture of silicon semiconductor devices and to the devices made thereby, and more particularly to a method for epitaxially growing an inert single crystal dielectric coating on a monocrystalline silicon semiconductor material.

Silicon semiconductor devices of the prior art have surfaces covered by inert and insulating coatings, e.g. silicon dioxide. These coatings are utilized as diffusion masks, passivating layers, and in some devices as part of the active device. Silicon dioxide as a passivating layer has certain shortcomings, including instability, some of which are due to its amorphous nature. Other possible prior art coatings are undesirable because of instability or reaction with the substrate.

It is an object of this invention to provide a crystalline coating on silicon monocrystalline semiconductor material to serve as a stable passivating layer.

It is another object of this invention to provide a silicon semiconductor substrate having a crystalline diffusion mask on its surface.

Another object of this invention is the deposition of an insulating substrate for the epitaxial growth of a monocrystalline silicon layer.

Still another object of this invention is a method by which an inert single crystal coating may be epitaxially grown on a silicon monocrystalline semiconductor body.

A still further object of this invention is the epitaxial growth of a silicon dielectric compound on a silicon substrate.

These and other objects of this invention will become more apparent upon consideration of the following description taken together with the accompanying drawing, in which.

A feature of this invention is the provision of an epitaxially grown silicon nitride passivating layer grown over a silicon substrate to result in a monocrystalline material of the same crystal orientation as the silicon substrate.

Figure 1:
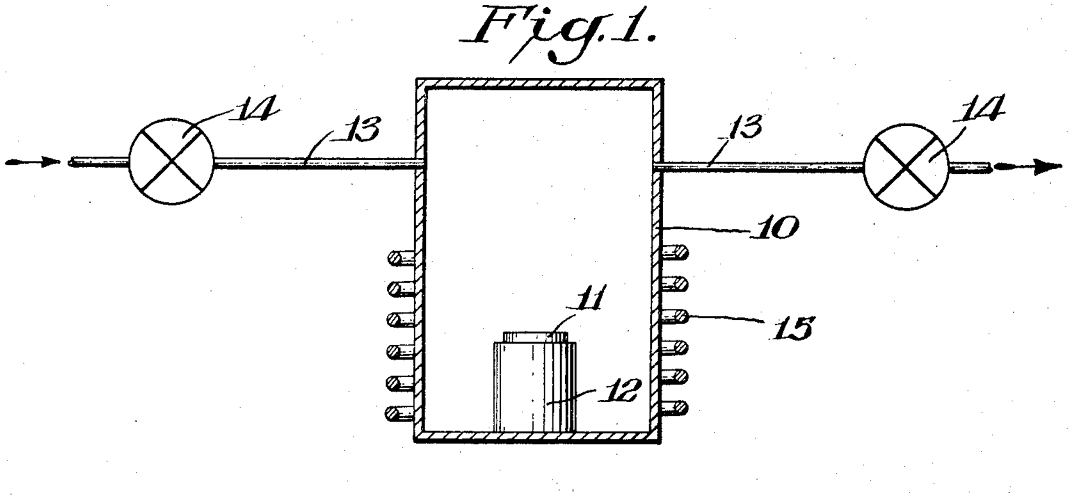
FIGURE 1 is a schematic representation of apparatus for carrying out the method of this invention.

With reference to the drawing, FIGURE 1 represents apparatus in which a structure was grown according to this invention by carrying out the different steps in a reaction chamber 10 containing a monocrystalline silicon substrate 11 mounted on a support 12. The chamber 10 has associated conduits 13 and valves 14 for supplying gases to the chamber. An R.F. coil 15 encompasses the region of the chamber 10 containing the support 12 and the substrate 11.

Figure 2:
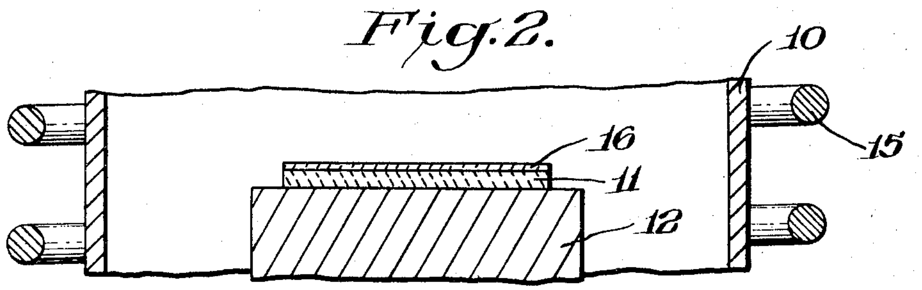
FIGURE 2 shows a structure manufactured according to this invention in a partial and enlarged view of the apparatus of FIGURE 1.

A layer 16 of silicon nitride, $Si_3N_4$, was grown on the (111) face of silicon substrate 11 from a mixture of nitrogen gas in argon. The gaseous mixture was brought into the chamber 10 under a low pressure and subjected to an R.F. field of around 435 kc. to produce a glow discharge in which the nitrogen glowed. The pressure in the chamber 10 was reduced to a few microns which is sufficient to enhance the glow discharge. The glow discharge in the R.F. field resulted in the deposition of the silicon nitride layer 16 by epitaxial growth, as depicted in FIGURE 2.

The layer 16 is a crystalline layer or more particularly a single crystal layer on the silicon surface and of the same crystal orientation as the substrate 11.

The production of the silicon nitride layer 16 with the same crystal orientation as the silicon substrate 11 is attributable to the similarity of the crystal silicon spacings and symmetry in the two materials on the (111) face of the silicon substrate 11.

The silicon nitride 16 is a dielectric on the semiconductor 11. Among other advantages the silicon nitride layer 16 is an effective stable passivating layer for a silicon planar transistor. As a passivating layer the single crystal nitride does not have the trapping levels of amorphous materials that are used for this purpose, such as silicon dioxide.

Further the silicon nitride layer of this invention is useful as a mask in the diffusion techniques employed in the production of planar semiconductive devices. The nitride layer is particularly advantageous in this application as it may be etched with hydrogen fluoride in a manner similar to silicon dioxide masks. Thus openings may be created in the nitride mask for localized indiffusion after which the opening may be closed by regrowth of the nitride layer. Regrowth of the nitride layer is accomplished by carrying on the diffusion in an activated nitrogen atmosphere.

Figure 3:
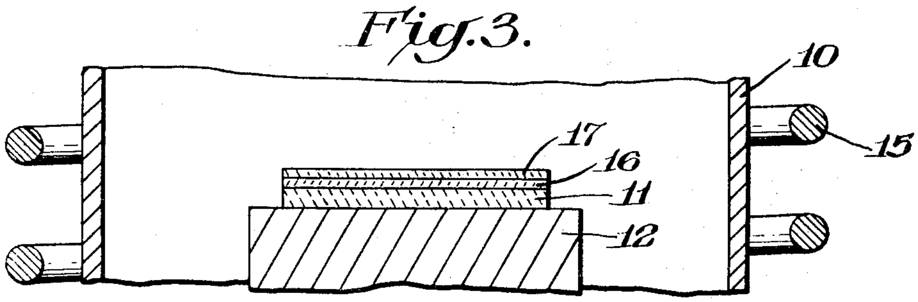
FIGURE 3 shows a modified structure manufactured according to this invention in a partial and enlarged view of the apparatus of FIGURE 1.

A modification of this invention is depicted in FIGURE 3 wherein the chamber 10 is shown containing the support 12 carrying the substrate 11 of silicon. The silicon substrate 11 was heated and nitride layer 16 was grown on the substrate 11 by deposition from a mixture of nitrogen gas and argon gas as described above. An epitaxial layer 17 of silicon was then grown on the nitride layer 16 by the reduction of silicon tetrachloride in hydrogen at a temperature of around 1250° C. The silicon tetrachloride and high purity hydrogen carrier gas were held in a reservoir (not shown) and introduced into the chamber 10 and passed over the nitride 16. The mixture of carrier gas and silicon tetrachloride was reacted in chamber 10 and the layer 17 was epitaxially grown.

The layer 17 was a monocrystalline layer of silicon of the same crystal orientation as the substrate 11. In the resultant structure the epitaxial layer 17 was electrically isolated from the silicon substrate 11 by the inert dielectric nitride layer 16.

It should be understood that the described embodiments of this invention are only for the purpose of illustration. The principle of this invention is employed in variations, for example, it is possible to modify the temperature in the growth of the silicon epitaxial layer. Also the growth of the nitride layer can be varied. The flexibility of this means and method will also be appreciated. If desired the alternate process can be repeated completely or partially. The characteristics of the resultant product are correspondingly varied.

The above-described embodiments and particularly the embodiment of applying a silicon nitride layer on a silicon substrate have been found effective in practice. However, without departing from the spirit of this invention various modifications may be made as exemplified in the modifications indicated above. and therefore is intended that the invention be limited only by the scope of the appended claims.

What is claimed is:

1. The process of producing a single crystal silicon nitride layer on a monocrystalline substrate which comprises providing a gaseous nitrogen containing atmosphere in contact with a surface of the silicon substrate, treating the nitrogen in the gaseous atmosphere to react with the monocrystalline silicon depositing single crystal silicon nitride on the monocrystalline silicon surface in a thin layer whereby the monocrystalline silicon substrate is coated with a single crystal nitride layer having similar crystal silicon spacings.

2. The process as claimed in claim 1 in which the silicon nitride layer is grown on the (111) face of the substrate.

3. In the process of claim 1 the step of growing a second layer of monocrystal silicon semiconductor material on the silicon nitride layer, said monocrystalline silicon semiconductor layer having the same crystal orientation as the substrate and the silicon nitride layer.

4. In a method of fabricating a semiconductor structure the step of placing a surface of a monocrystalline silicon substrate in a gaseous mixture of nitrogen gas in argon under a reduced pressure, subjecting said silicon surface and gaseous mixture to a R.F. field reacting the silicon with the nitrogen and depositing a single crystal nitride in a layer on said monocrystalline silicon surface so that there is symmetry in the monocrystalline silicon and the silicon nitride on the face of the substrate.

5. The method as claimed in claim 4 in which the silicon nitride layer is deposited on the (111) face of the substrate.

6. A semiconductor device comprising a monocrystalline silicon semiconductor wafer, an epitaxial layer of single crystal silicon nitride on a surface of said wafer of the same monocrystalline orientation as the wafer.

7. A semiconductor device comprising a monocrystalline silicon semiconductor wafer, an epitaxial layer of single crystal silicon nitride on said wafer, and a layer of monocrystalline semiconductor material overlying said silicon nitride layer.

8. A semiconductor device comprising a monocrystalline semiconductor wafer, a first epitaxial layer of silicon semiconductor material on said wafer, an epitaxial layer of silicon nitride overlying said first epitaxial layer having similar silicon spacings, and a layer of monocrystalline semiconductor material overlying said silicon nitride layer and having the same crystal orientation as said first epitaxial layer.

References Cited

UNITED STATES PATENTS

| | | | |
|---|---|---|---|
| 3,073,717 | 1/1963 | Pyle et al. | 117—106 |
| 3,149,398 | 9/1964 | Sprague et al. | 117—106 X |
| 3,246,214 | 4/1966 | Hugle | 117—200 X |

WILLIAM L. JARVIS, *Primary Examiner.*

U.S. Cl. X.R.

117—106; 148—175